US011886785B2

(12) United States Patent
Oh et al.

(10) Patent No.: US 11,886,785 B2
(45) Date of Patent: Jan. 30, 2024

(54) METHOD FOR VERIFYING CONVOLUTIONAL NEURAL NETWORK MODEL AND DEVICE THEREOF

(71) Applicants: IUCF-HYU (Industry-University Cooperation Foundation Hanyang University), Seoul (KR); Kookmin University Industry Academy Cooperation Foundation, Seoul (KR)

(72) Inventors: Hyunok Oh, Seoul (KR); Hankyung Ko, Seoul (KR); Jihye Kim, Seoul (KR); Seunghwa Lee, Seoul (KR)

(73) Assignees: IUCF-HYU (Industry-University Cooperation Foundation Hanyang University), Seoul (KR); Kookmin University Industry Academy Cooperation Foundation, Seoul (KR)

( * ) Notice: Subject to any disclaimer, the term of this patent is extended or adjusted under 35 U.S.C. 154(b) by 404 days.

(21) Appl. No.: 17/323,351

(22) Filed: May 18, 2021

(65) Prior Publication Data

US 2021/0406436 A1    Dec. 30, 2021

(30) Foreign Application Priority Data

Jun. 30, 2020   (KR) .................. 10-2020-0079745
Dec. 10, 2020   (KR) .................. 10-2020-0172335

(51) Int. Cl.
*G06F 30/30*    (2020.01)
*G06F 30/33*    (2020.01)
*G06N 3/04*     (2023.01)

(52) U.S. Cl.
CPC .............. *G06F 30/33* (2020.01); *G06N 3/04* (2013.01)

(58) Field of Classification Search
CPC ........... G06F 30/33; G06F 30/27; G06N 3/04; G06N 3/045; G06N 3/048; H04L 9/3093; H04L 9/3218
See application file for complete search history.

(56) References Cited

U.S. PATENT DOCUMENTS

2019/0385057 A1* 12/2019 Litichever ............... H04L 63/14
2020/0342222 A1* 10/2020 Bahloul ................ H04L 9/3247

OTHER PUBLICATIONS

Campanelli et al., "LegoSNARK:ModularDesignandCompositionof SuccinctZero-KnowledgeProofs", CCS '19, Nov. 11-15, 2019, London, United Kingdom (Year: 2019).*

* cited by examiner

*Primary Examiner* — Jack Chiang
*Assistant Examiner* — Brandon Bowers
(74) *Attorney, Agent, or Firm* — NKL LAW; Jae Youn Kim

(57) ABSTRACT

Disclosed are a method for verifying a convolutional neural network model and a device thereof. The method for verifying the convolutional neural network model includes (a) generating a polynomial circuit equation for a first configuration of a plurality of configurations configuring the convolutional neural network model; (b) generating a first commitment value and a first proof value by applying a zero-knowledge proof scheme based on the polynomial circuit equation; (c) generating an arithmetic circuit equation for a second configuration of the plurality of configurations; (d) generating a second commitment value and a second proof value by applying a zero-knowledge proof scheme based on the arithmetic circuit equation; and (e) generating a connection proof value connecting the first commitment value and the second commitment value.

12 Claims, 15 Drawing Sheets

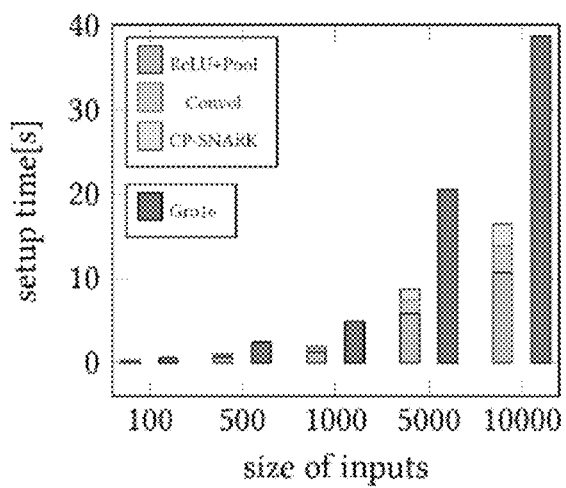
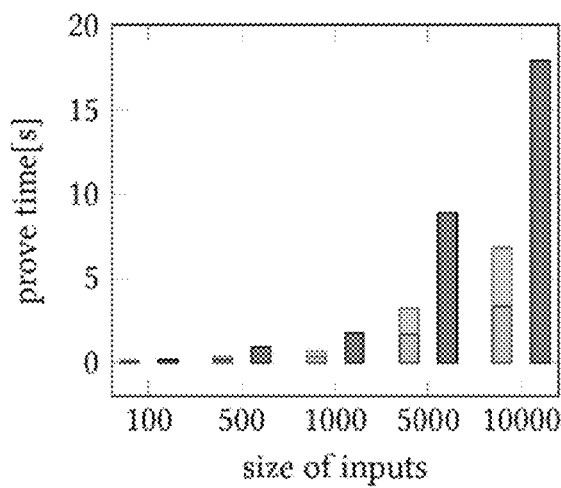
FIG. 8A  FIG. 8B

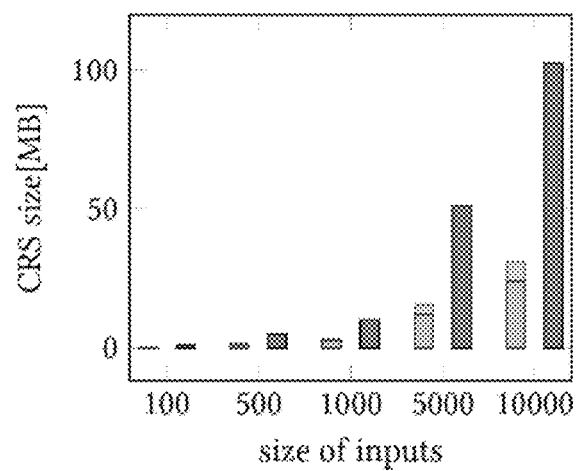
FIG. 8C
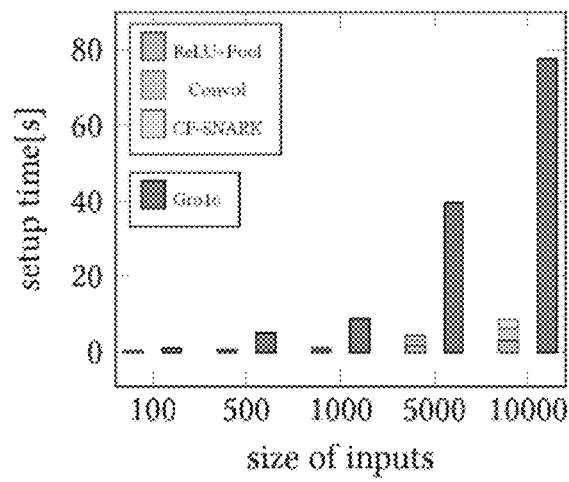
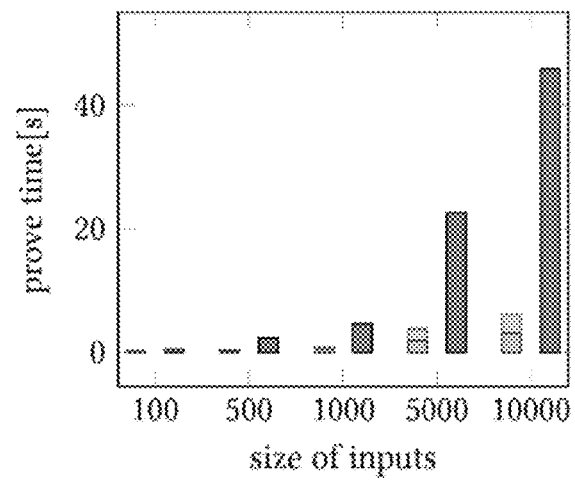
FIG. 9A                    FIG. 9B

METHOD FOR VERIFYING CONVOLUTIONAL NEURAL NETWORK MODEL AND DEVICE THEREOF

CROSS-REFERENCE TO RELATED APPLICATION

This application claims under 35 U.S.C. § 119(a) the benefit of Korean Patent Application Nos. 10-2020-0079745 filed on Jun. 30, 2020 and 10-2020-0172335 filed on Dec. 10, 2020, the entire contents of which are incorporated herein by reference.

BACKGROUND

(a) Technical Field

The present invention relates to a method for verifying a convolutional neural network model and a device thereof.

(b) Background Art

Machine learning and neural networks have greatly extended the understanding on data and insight on data. Among them, a convolutional neural network (CNN) based on a convolution operation is a particular useful tool for classification and recognition compared to a standard neural network, and the CNN provides a better recognition rate while being easily trained with much less connection and parameters.

Accordingly, the CNN generates various business opportunities based on legal, bank, insurance, document digitization, health care prediction analysis, etc. However, since the CNN is vulnerable to malfunction or operation, special attention is needed when the CNN is actually applied to application programs.

For example, a sentence made by an AI-based judge is changed by an attacker on purpose, and as a result, a person who is innocent may be convicted. The incorrect results of medical prediction and precision medical using the CNN are much more disastrous because the life of many users depends thereon.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide a method for verifying a convolutional neural network model and a device thereof.

Another object of the present invention is to provide a method for verifying a convolutional neural network model and a device thereof capable of verifying identity by separating a convolution operation and other operations to generate commitment and proof values in a convolutional neural network model.

Yet another object of the present invention is to provide a method for verifying a convolutional neural network model and a device thereof capable of actually verifying the convolutional neural network model by significantly reducing a verification time for zero-knowledge proof for the convolutional neural network model.

According to an aspect of the present invention, there is provided a method for verifying a convolutional neural network model.

According to an embodiment of the present invention, there may be provided a method for verifying a convolutional neural network model including: (a) generating a polynomial circuit equation for a first configuration of a plurality of configurations configuring the convolutional neural network model; (b) generating a first commitment value and a first proof value by applying a zero-knowledge proof scheme based on the polynomial circuit equation; (c) generating an arithmetic circuit equation for a second configuration of the plurality of configurations; (d) generating a second commitment value and a second proof value by applying a zero-knowledge proof scheme based on the arithmetic circuit equation; and (e) generating a connection proof value connecting the first commitment value and the second commitment value.

The first configuration may be a convolution operation, and the second configuration may be other operations except for the convolution operation.

The polynomial circuit equation may be configured by a single multiplication gate, and the single multiplication gate may include two input polynomial circuit equations and one output polynomial circuit equation, wherein one of the two input polynomial circuit equations may be a polynomial having input values for the convolution operation as a coefficient of each degree and the other input polynomial circuit equation may be a polynomial having element values of a kernel of the convolution operation as a coefficient of each degree, and the output polynomial circuit equation may be a polynomial circuit equation for a product of results of the two input polynomial circuit equations.

The first output value may be generated by further considering a contingent intermediate variable (Z).

The contingent intermediate variable (Z) may be applied to all of the two input polynomial circuits.

The polynomial circuit may be a quadratic polynomial program (QPP)-based circuit, the arithmetic circuit may be a quadratic arithmetic program (QAP)-based circuit, and the connection proof may be generated based on Lego-SNARK.

The method may further include proving the convolutional neural network model by using the first commitment value, the second commitment value, the connection proof value, the convolution proof value, and the other operation proof values.

According to an aspect of the present invention, there is provided a device for verifying a convolutional neural network model.

According to an embodiment of the present invention, there may be provided a device for verifying a convolutional neural network model including: a memory for storing at least one instruction; and a processor for executing the instructions stored in the memory, wherein the instructions may perform the steps of: (a) generating a polynomial circuit equation for a convolution operation configuring the convolutional neural network model; (b) generating a first commitment value and a first proof value by applying a zero-knowledge proof scheme based on the polynomial circuit equation; (c) generating an arithmetic circuit equation for ReLU and pooling operations configuring the convolutional neural network model; (d) generating a second commitment value and a second proof value by applying a zero-knowledge proof scheme based on the arithmetic circuit equation; and (e) generating a connection proof value connecting the first commitment value and the second commitment value.

According to an embodiment of the present invention, by providing the method for verifying the convolutional neural network model and the device thereof, it is possible to perform a public verification while protecting the privacy of parameters of the neural network model.

Further, it is possible to verify the identity by separating a convolution operation and other operations to generate commitment and proof values in the convolutional neural network model.

Further, it is possible to actually verify a convolutional neural network model by significantly reducing a prove time for zero-knowledge proof for the convolutional neural network model.

It should be understood that the effects of the present invention are not limited to the effects described above, but include all effects that can be deduced from the detailed description of the present invention or configurations of the invention described in appended claims.

BRIEF DESCRIPTION OF THE DRAWINGS

FIGS. 8A-8C, and 9A-9C are graphs of comparing verification results for a small CNN having one convolution layer and one pooling layer.

DETAILED DESCRIPTION

A singular form used in this specification may include a plural form unless otherwise clearly noted in the context. In this specification, the term such as "comprising" or "including" should not be interpreted as necessarily including all various components or various steps disclosed in the specification, and it should be interpreted that some component or some steps among them may not be included or additional components or steps may be further included. In addition, terms including "part", "module", and the like disclosed in the specification mean a unit that processes at least one function or operation and this may be implemented by hardware or software or a combination of hardware and software.

The present invention is to verify a convolutional neural network model, and may verify the convolutional neural network model by separating a convolution operation and other operations (ReLU operation and pooling operation) of the convolutional neural network model to transform each operation into a circuit equation and then generating commitment and proof values based on zero-knowledge proof.

This will be more clearly understood by the following description.

Hereinafter, embodiments of the present invention will be described in detail with reference to the accompanying drawings.

Figure 1:
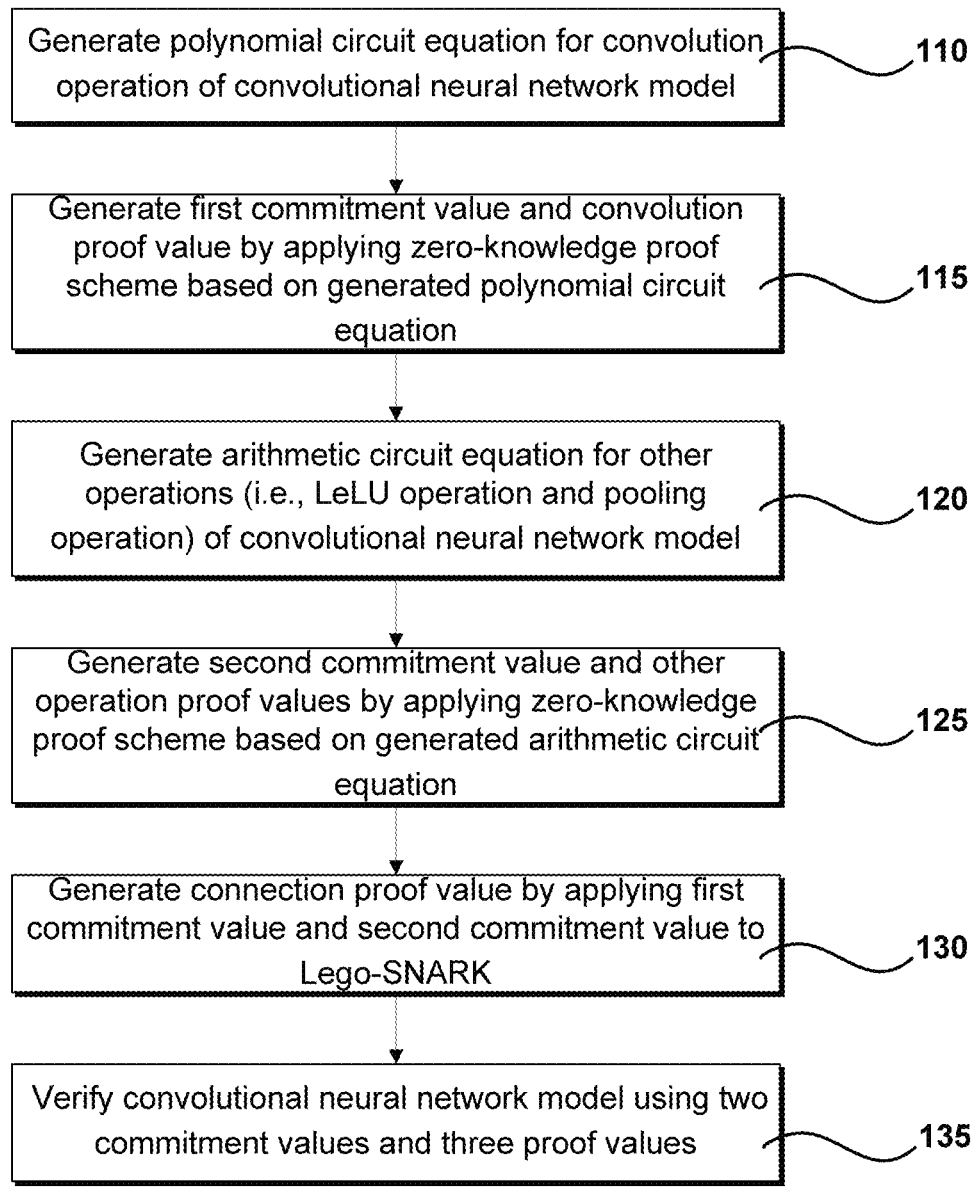
FIG. 1 is a flowchart illustrating a method for verifying a convolutional neural network model according to an embodiment of the present invention.
Figure 2:
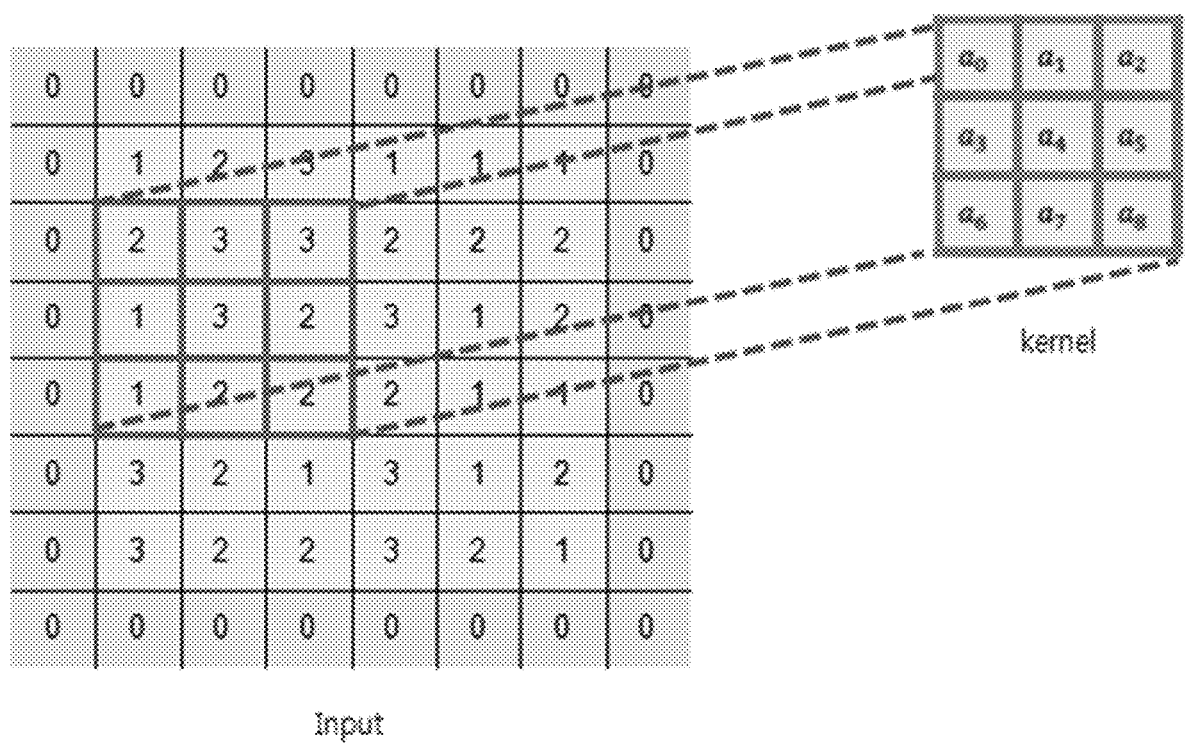
FIGS. 2 and 3 are diagrams illustrating a convolution operation according to an embodiment of the present invention.
Figure 3:
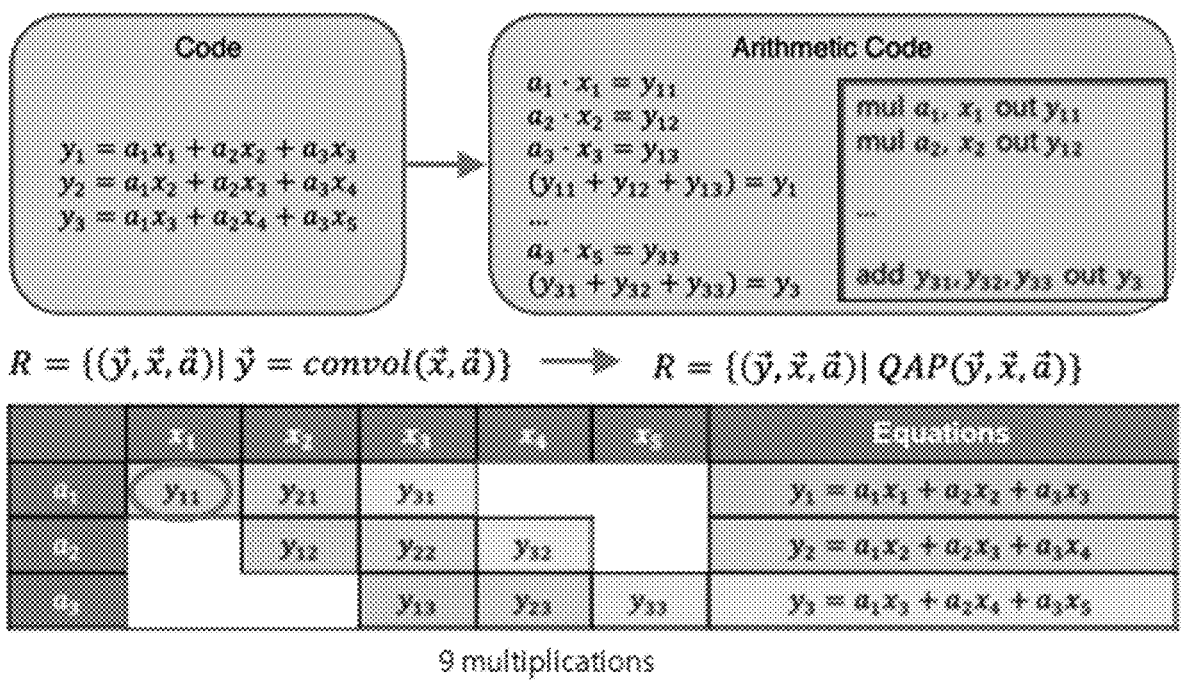
Figure 4:
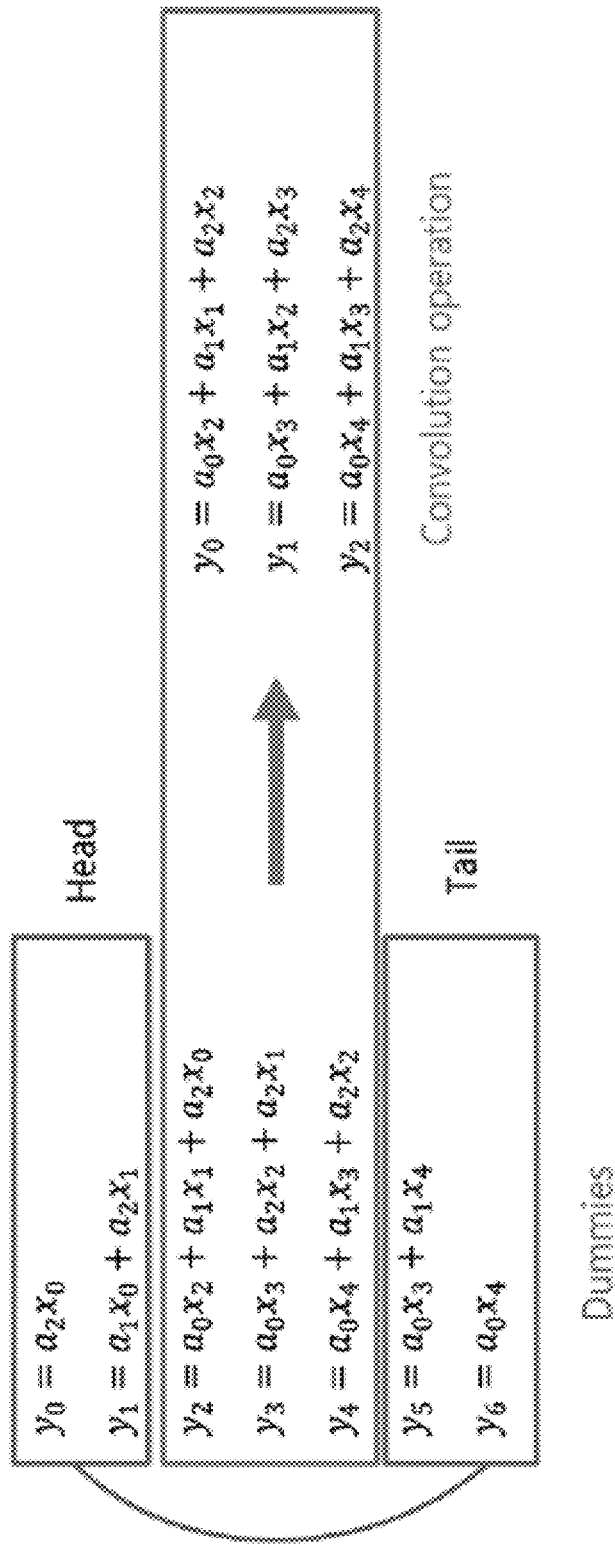
FIG. 4 is a diagram illustrating a polynomial circuit equation according to an embodiment of the present invention.
Figure 5:
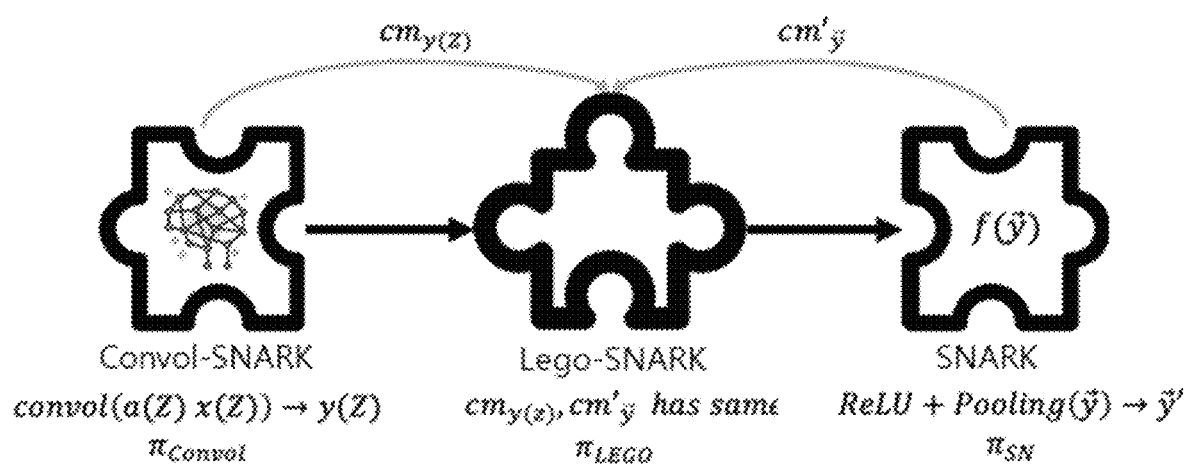
FIG. 5 is a diagram illustrating generation of a connection proof value using Lego-SNARK according to an embodiment of the present invention.
Figure 6:
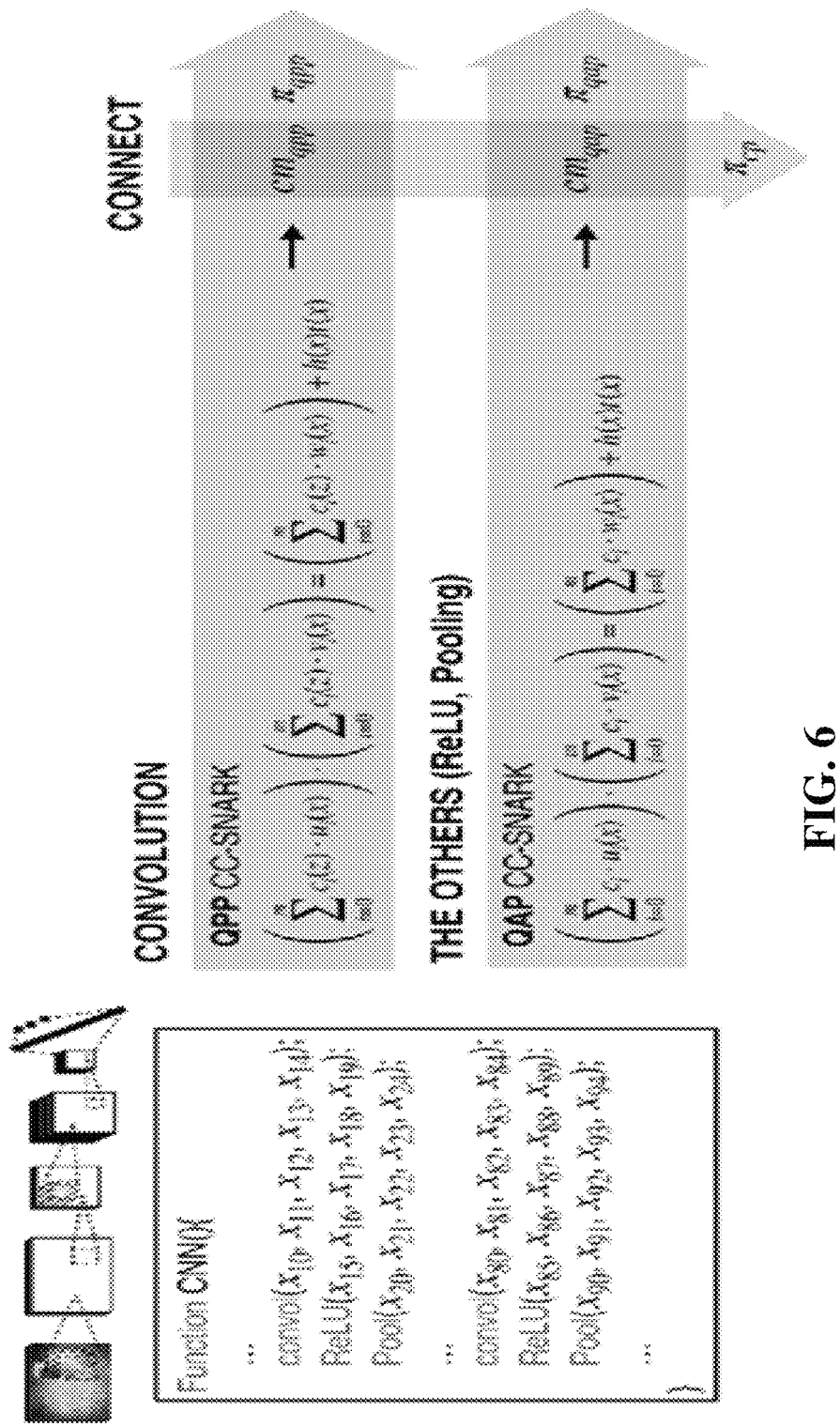
FIG. 6 is a diagram schematically illustrating a verification scheme for a convolution neural network model according to an embodiment of the present invention.

FIG. 1 is a flowchart illustrating a method for verifying a convolutional neural network model according to an embodiment of the present invention, FIGS. 2 and 3 are diagrams illustrating a convolution operation according to an embodiment of the present invention, FIG. 4 is a diagram illustrating a polynomial circuit equation according to an embodiment of the present invention, FIG. 5 is a diagram illustrating generation of a connection proof value using Lego-SNARK according to an embodiment of the present invention, and FIG. 6 is a diagram schematically illustrating a verification scheme for a convolution neural network model according to an embodiment of the present invention.

Hereinafter, a method for verifying a convolutional neural network model consisting of a convolution layer, and ReLU and pooling layers will be described.

In step 110, a verification device 100 generates a polynomial circuit equation (QPP) of a convolution operation in the convolutional neural network model.

The convolution operation filters an input value by using a kernel. That is, the convolution operation is calculated through an inner product of the kernel and the input, as shown in FIG. 2.

The convolution operation is represented by Equation 1.

$$y_i = \sum_{j=[l]} a_j \cdot x_{i-j+l-1} \qquad \text{[Equation 1]}$$

Here, $\{a_j\}_{j \in [l]}$ represents a kernel of the convolution operation, $\{x_i\}_{i \in [n]}$ represents an input value for the convolution operation, and $\{y_i\}_{i \in [n-l]}$ represents an output value according to the convolution operation. Here, $i \in [n]$.

This convolution operation can be expressed by using a quadratic arithmetic program (QAP) among arithmetic circuit expression techniques. In such a QAP, the convolution operation has n outputs and l multiplications per output, and as a result, n×l multiplication gates are required.

FIG. 3 is a diagram illustrating a small convolution operation. In FIG. 3, it is assumed that an input size is 5 and a kernel size is 3 for the convolution operation and it will be described.

In this case, it can be seen that the QAP requires 9 multiplication gates.

That is, in the case of Equation 1, since the result of the convolution operation is represented by the sum of the products based on the QAP, a lot of multiplication gates are required.

Accordingly, in an embodiment of the present invention, the convolution operation was designed to include a single multiplication gate by transforming the convolution operation into a product form of the sum as shown in Equation 2 to reduce the number of multiplication gates.

$$\sum_{i \in [n+l-1]} y'_i = \left(\sum_{i \in [n]} x_i\right) \cdot \left(\sum_{i \in [l]} a_i\right) \quad \text{[Equation 2]}$$

However, it is easy to find an inaccurate output value $\vec{y}'$ different from an accurate output value $\vec{y}$ to make the sum of two outputs equal. Accordingly, in order to distinguish each output value $y_i$, as shown in Equation 3, an unknown intermediate variable Z having $O(|\vec{x}|+|\vec{a}|)(=O(n+l))$ will be used.

$$\sum_{i \in [n+l-1]} y_i \cdot Z^i = \left(\sum_{i \in [n]} x_i \cdot Z^i\right) \cdot \left(\sum_{i \in [l]} a_i \cdot Z^i\right) \quad \text{[Equation 3]}$$

The deployment of Equation 3 is as illustrated in FIG. 4.

In the change to Equation 3, the number of outputs is slightly increased by 2l–2 in Equation 1 having n outputs. In order to formulate Equation 3, in one embodiment of the present invention, two approach methods were considered. The two approach methods of point calculation approach and a polynomial circuit with an intermediate variable were considered.

In the point calculation method, d+1 different points should be evaluated for a d-degree polynomial, and this requires a $O(d^2)$ multiplication operation because there are d multiplications and d+1 points per point calculation.

The point calculation may be performed using a number theoretic transform (NTT) of $O(d \log d)$ However, due to complexity of the NTT, a calculation overhead is serious if d is not sufficiently large in the NTT.

In the QPP, a wire may have a polynomial as a value. Therefore, the equation may be expressed directly with a single multiplication gate having two input polynomials and output polynomials. The point calculation approach method requires a quadratic $O(d^2)$ or semi-linear $O(d \log d)$ multiplication operation, but the QPP approach requires an $O(d)$ operation.

In step 115, the verification device 100 is applied to a zero-knowledge proof scheme based on the generated polynomial circuit equation to generate a first commitment value and a convolution proof value. Here, the first commitment value may be a commitment value according to the result of the convolution operation.

In step S120, the verification device 100 generates an arithmetic circuit equation for other configurations (i.e., ReLU operation and pooling operation) of the convolutional neural network model.

The QAP may be generated by the ReLU operation and the pooling operation.

It is inefficient to apply the QPP by applying a contingent intermediate variable Z for the whole convolutional neural network model, including the ReLU operation and the pooling operation.

Therefore, since the amount of calculation is relatively small compared to the convolution operation, a second commitment value and other operation proof values may be generated by applying the QAP to the ReLU operation and the pooling operation.

In addition, the QAP may not consider the contingent intermediate variable Z.

In step 125, the verification device 100 generates a second commitment value and other operation proof values by applying a zero-knowledge proof scheme based on the generated arithmetic circuit equation.

In step 130, the verification device 100 generates a connection proof value by applying the first commitment value and the second commitment value to Lego-SNARK. Since the Lego-SNARK is known, a separate description thereof will be omitted.

This will be described in more detail with reference to FIG. 5. As illustrated in FIG. 5, the verification device 100 may separate the convolution operation and other operations (ReLU and pooling) to generate proof and commitment values, respectively. At this time, the verification device 100 may generate a connection proof value secured so that the QPP and the QAP are mutually connected with an input of one component corresponding to an output of the other component by using Lego-SNARK as CP-SNARK.

In step 135, the verification device 100 verifies the convolutional neural network model by using two commitment value s and three proof values.

The whole configuration of the verification scheme for the convolutional neural network model according to an embodiment of the present invention may be illustrated in FIG. 6.

The convolution operation and other operations configuring the convolutional neural network model are separated and then a commitment value and a proof value may be generated by applying QPP-based CC-SNARK to the convolution operation and a commitment value and a proof value may be generated by applying QAP-based CC-SNARK to other operations. Then, the CP-SNARK is applied to ensure connectivity to the convolution operation and other operations to generate a connection proof value. As such, the convolutional neural network model may be verified using two commitment values and three proof values.

This will be more clearly understood by the following description.

The notation for each word (term) to be described below will be first defined.

[n] represents an index set of $\{0, 1, \ldots, N-1\}$.

An input of the convolution operation will be represented as $\{x_i\}_{i \in [n]}$, the size of the input represents n, and a kernel of the convolution will be represented as $\{a_i\}_{i \in [n]}$, Here, the size of the kernel is l.

Further, in an embodiment of the present invention, a bilinear group (p, $G_1$, $G_2$, $G_T$, e, $\hat{G}_1$, $\hat{G}_2$) having the following attribute is used.

$G_1$, $G_2$, $G_T$ is a group of minority p, including generators $G_1 \in G_1$, $G_2 \in G_2$.

A pairing e: $G_1 \times G_2 \to G_T$ is a bilinear map.

$e(G_1, G_2)$ generates $G_T$.

Quadratic Arithmetic Program (QAP)

The QAP is an arithmetic circuit equation for encoding an expression given with addition and multiplication. The accuracy of the calculation can be tested using the QAP by performing a division test between the polynomials. With an encryption protocol, the divisibility of a single polynomial may be confirmed, and a verifier that does malpractice may not prepare a witness of false statements.

Definition of QAP

The QAP consists of three polynomials $\{u_i(X), v_i(X), w_i(X)\}_{i=0}^m$ and a target polynomial t(X). If $(c_1, \ldots, c_{l-1})$ is a valid allocation for both input and output and there is a coefficient $(c_l, \ldots, c_m)$ dividing $P(X)$ by $t(X)$, an arithmetic circuit is calculated.

$$p(X) = \left(\sum_{i=1}^{m} c_i \cdot u_i(X)\right) \cdot \left(\sum_{i=1}^{m} c_i \cdot v_i(X)\right) - \left(\sum_{i=1}^{m} c_i \cdot w_k(X)\right)$$

The QAP calculates an arithmetic circuit that satisfies the definition described above. The size of the QAP is m and the degree is the degree of $t(X)$.

In the aforementioned definition, $t(X) = \Pi_{i \in mul}(x - r_i)$. Wherein, mul represents a set of multiplication gates in the arithmetic circuit and $r_j$ is a random label of the corresponding multiplication gate.

A polynomial $u_i(X)$ encodes a left input, $v_i(X)$ encodes a right input, and $w_i(X)$ encodes a gate output.

According to the definition, if $r_j$ is a root of the polynomial $p(X)$, $p(r_j)$ represents a relationship between inputs and outputs for a multiplication gate g.

Quadratic Polynomial Program (QPP)

The QAP verifies a wire represented as an arithmetic value in the arithmetic circuit. Except for a circuit wire represented by a univariate polynomial, the QPP is defined similarly to the QAP.

Definition of QPP

The QPP for a polynomial circuit consists of three polynomials $\{u_i(X), v_i(X), w_i(X)\}_{i=1}^{m}$ and a target polynomial $t(X)$.

If $(c_1(Z), \ldots, c_l(Z))$ is a valid allocation for both input and output and there is a coefficient $(c_{l+1}, \ldots, c_m)$ dividing $p(X, Z)$ such as Equation 1 by $t(X)$, a wire is calculated.

$$p(X, Z) = \left(\sum_{i=1}^{m} c_i(Z) \cdot u_i(X)\right) \cdot \left(\sum_{i=1}^{m} c_i(Z) \cdot v_i(X)\right) - \left(\sum_{i=1}^{m} c_i(Z) \cdot w_k(X)\right) \quad \text{[Equation 4]}$$

The QPP that satisfies the definition described above calculates the circuit. The size of the QPP is m and the degree is t).

Similarly to the QAP definition, $u_i(X)$, $v_i(X)$, and $w_i(X)$ represent gates, $u_i(X)$ encodes a left input, $v_i(X)$ encodes a right input, and $w_i(X)$ represents an output. If a left input wire of the multiplication gate $r_j$ is $c_l(Z)$, a right wire is $c_r(Z)$, and an output is $c_o(Z)$.

Accordingly, $c_l(Z) \cdot c_r(Z) = c_o(Z)$, which may be represented as $$\left(\sum_{i=1}^{m} c_i(Z) \cdot u_i(r_j)\right)\left(\sum_{i=1}^{m} c_i(Z) \cdot v_i(r_j)\right) = \left(\sum_{i=1}^{m} c_i(Z) \cdot w_i(r_j)\right).$$

Definition of zK-SNARK zk-SNARK for a relationship R is the following PPT algorithm (KeyGen, Prove, Verify, Sim).

(crs, $\tau$)←Setup(R): A setup algorithm takes a relationship $R \in R_\lambda$ as an input, and returns a common reference string (crs) and a trap door (td).

$\pi$←Prove(crs, $\phi$, w): A proof algorithm takes a crs and ($\phi$, w)∈R for the relationship R as an input, and returns a proof $\pi$.

0/1←Verify(crs, $\phi$, $\pi$): A verification algorithm takes a crs, a state $\phi$, and a proof $\pi$ as an input, and returns 0 (rejection) or 1 (acceptance).

$\pi$←Sim(crs, td, $\phi$): A simulator algorithm takes a crs, a trap door (td), and a state $\phi$ as an input, and returns a proof $\pi$.

The zero-knowledge proof needs to satisfy three conditions of completeness, soundness, and zero-knowledge.

Completeness: If any condition is true, a reliable verifier should be able to convince this fact by a reliable witness.

A complete probability of all ($\phi$, w)∈R is as follows.

$$Pr\left[\text{Verify}(crs, \phi, \pi) = 1 \;\middle|\; \begin{array}{l} (crs, td) \leftarrow \text{Setup}(R), \\ \pi \leftarrow \text{Prove}(crs, \phi, w) \end{array}\right] = 1$$

Soundness: If any condition is false, an unreliable verifier should be not able to convince the verifier that the condition is true through a lie. If the verifier needs to know the witness and knowledge may be efficiently extracted from the verifier by a knowledge extractor, there is calculated knowledge soundness.

The knowledge proof requires that there is an extractor XA of outputting the following valid witness when the same input of A is given for a PPT attacker A generating an accepting proof.

$$Pr = \left[\begin{array}{c} \text{Verify}(crs, \phi, \pi) = 1 \\ \wedge (\phi, w) \notin R \end{array} \;\middle|\; \begin{array}{l} (crs, td) \leftarrow \text{Setup}(R), \\ (\phi, \pi, w) \leftarrow (\mathcal{A} \,|\, \chi_{\mathcal{A}})(R, crs, z) \end{array}\right] \approx 0$$

Wherein, z is an assistant input.

Succinctness: The length of the proof is $|\pi| \leq \text{poly}(k) \text{polylog}(|x| + |w|)$.

Perfect zero-knowledge: Information other than the true statement should not be leaked.

If the following conditions are satisfied for all (R, z)←R, ($\phi$, w)←R and all attackers A, it is a perfect zero-knowledge.

$$Pr\left[\mathcal{A}(R, z, crs, td, \pi) = 1 \;\middle|\; \begin{array}{l} (crs, td) \leftarrow \text{Setup}(R), \\ \pi \leftarrow \text{Prove}(crs, \phi, w) \end{array}\right] =$$

$$Pr\left[\mathcal{A}(R, z, crs, td, \pi) = 1 \;\middle|\; \begin{array}{l} (crs, td) \leftarrow \text{Setup}(R), \\ \pi \leftarrow \text{Sim}(crs, td, \phi) \end{array}\right]$$

SNARK Commit and Prove

A commit and prove SNARK scheme is a zk-SNARK scheme to prove the knowledge of ($\phi$, w), and u is a message of a relationship $R(\phi, w) = 1$ with a commitment cm. Here, $u \in w$.

A CP-SNARK scheme includes the following PPT algorithm (KeyGen, Prove, Verify, Sim).

(crs, td)←Setup(ck, R): A setup algorithm takes a difference between a relationship $R \in R_\lambda$ and a commitment key as an input and returns a common reference string (crs) and a trap door (td).

$\pi$←Prove(crs, $\phi$, $\{c_j, u_j, o_j\}_{j=1}^{l}$, w): A proof algorithm takes commitment value $c_j$, an input $u_j$, and an opening $o_j$, for a relationship R, ($\phi$, w)∈R, as an input, and returns a proof value $\pi$.

0/1←Verify(crs, $\phi$, $\{c_j\}_{j=1}^{l}$, $\pi$): A verification algorithm takes a crs, a state $\bar{\phi}$, a commitment value $c_j$, and a proof value $\pi$ as an input, and returns 0 (rejection) or 1 (acceptance).

$\pi$←Sim(crs, td, $\phi$, $\{c_j\}_{j=1}^{l}$): A simulator algorithm takes a crs, a trap door td, a state $\bar{\phi}$, and a commitment value $c_j$ as an input, and returns a proof value $\pi$.

Commitment and Cc-SNARKs

Similarly to the CP-SNARK, commitment and carry SNARKs (cc-SNARK) schemes prove a relationship with the commitment, but generate a commitment while proving the relationship.

A cc-SNARKs scheme has the following PPT algorithm (KeyGen, Prove, Verify, VerifyCom, Sim).

(ck, crs, td)←Setup(R): A setup algorithm takes a relationship R∈$R_\lambda$ as an input, and returns a commitment key ck, a crs and a trap door td.

(cm, π, r)←Prove(crs, ϕ, w): A proof algorithm takes a crs and (ϕ, w)∈R for the relationship R as an input, and returns a commitment value cm, a proof value ϕ, and an opening r.

0/1←Verify(crs, ϕ, cm, π): A verification algorithm takes a crs, a state $\bar{\phi}$, a commitment value cm, and a proof value π as an input, and returns 0 (rejection) or 1 (acceptance).

0/1←VerifyCom(ck, cm, u, r): A verification algorithm takes a commit key ck, a commitment value cm, a message u, and an opening r as an input, and returns 0 (rejection) or 1 (acceptance).

(cm, π)←Sim(crs, td, ϕ): A simulator algorithm takes a crs, a trap door td, and a state $\bar{\phi}$ as an input, and returns a commitment value cm and a proof π.

In one embodiment of the present invention, it is possible to establish a QPP-based zero-knowledge proof for the convolution operation. This will be described in more detail.

To prove Equation 3, a QPP-based zero-knowledge proof scheme will be configured.

In the QAP, each wire has only one value, while the QPP is allowed to have a polynomial on each wire.

A QPP-based zero-knowledge proof scheme according to an embodiment of the present invention will be described in more detail.

The QPP-based zero-knowledge proof scheme is as follows.

(crs, td)←Setup(R): A setup algorithm takes a relationship R∈$R_\lambda$ as an input, and returns a commitment key ck, a crs, and a trap door td.

α, β, γ, δ, x, $$z \xleftarrow{\$} Z^*_p$$

is selected. Wherein, td=(α, β, γ, δ, x, z) is defined and a crs is set. Wherein, $$crs = \begin{pmatrix} G_1^\alpha, G_1^\beta, G_1^\delta, \{G_1^{x^i \cdot z^j}\}_{i=0,j=0}^{d_x-1,d_z}, \\ G_2^\beta, G_2^\gamma, G_2^\delta, \{G_2^{x^i \cdot z^j}\}_{i=0,j=0}^{d_x-1,d_z}, \\ \{G_1^{\frac{\beta u_i(x)+\alpha v_i(x)+w_i(x)}{\gamma} z^j}\}_{i=0,j=0}^{l,d_z}, \\ \{G_1^{\frac{\beta u_i(x)+\alpha v_i(x)+w_i(x)}{\delta} z^j}\}_{i=l+1,j=0}^{m,d_z}, \\ \{G_1^{\frac{x^i \cdot z^j \cdot t(x)}{\delta}}\}_{i=0,j=0}^{d_x-2,d_z} \end{pmatrix}.$$

π←Prove(crs, ϕ, w): ϕ is parsed with ($a_0(Z)$, $a_1(Z)$, . . . , $a_l(Z)$) and w is parsed with ($a_{l+1}(Z)$, . . . , $a_m(Z)$). h(X, Z) is calculated from the QPP to be used as a witness. Further, $$r, s \xleftarrow{\$} Z^*_p$$

is selected and a proof π=($G_1^a$, $G_2^b$, $G_1^c$) is output.

Wherein, $$a = \alpha + \sum_{i=0}^{m} a_i(z)u_i(x) + r\delta \quad b = \beta + \sum_{i=0}^{m} a_i(z)v_i(x) + s\delta$$

$$c = \frac{\sum_{i=l+1}^{m} a_i(z) \cdot (\beta u_i(x) + \alpha v_i(x) + w_i(x)) + h(x,z)t(x)}{\delta} + as + rb - rs\delta.$$

0/1←Verify(crs, ϕ, π): ϕ is parsed with ($a_0(Z)$, $a_1(Z)$, . . . , $a_l(Z)$) and a proof π is parsed with (A, B, C). When the following equation is satisfied, the proof π is allowed.

$$e(A, B) = e(G_1^\alpha, G_2^\beta) \cdot e\left(\prod_{i=0}^{l} G_1^{a_i(z) \cdot \frac{\beta u_i(x)+\alpha v_i(x)+w_i(x)}{\gamma}}, G_2^\gamma\right) \cdot e(C, G_2^\delta)$$

π←Sim(τ, ϕ):

$$a, b \xleftarrow{\$} Z^*_p$$

is selected and $$c = \frac{ab - \alpha\beta - \sum_{i=0}^{l} a_i(z)(\beta u_i(x) + \alpha v_i(x) + w_i(x))}{\delta}$$

is included to calculate a simulated proof π=($G_1^a$, $G_2^b$, $G_1^c$).

The QPP-based zero-knowledge proof according to one embodiment of the present invention has the same structure as the QAP-based zero-knowledge proof, but there is a difference that a polynomial f(Z) is generated so that an unknown number z is included in the CRS.

In order to prove the convolution using Equation 3, the verifier performs a polynomial division (p(X, Z)/t(X)). for Equation 4 to calculate h(X, Z). The polynomial division may be efficiently performed using NTT for a univariate polynomial, but the NTT can not be applied directly to a bivariate polynomial of QPP. Accordingly, the bivariate polynomial is transformed into the univariate polynomial. In the QPP, a degree of X in p(X, Z) is $2d_x-2$. Wherein, $d_x$ is the number of multiplication gates. Accordingly, all terms may be distinguished by setting Z=$X^{2d_x-1}$, and a degree of p(X, $X^{2d_x-1}$) is $(2d_x-1)d_z$. Wherein, $d_z$ is a maximum degree of z. In Equation 3, since there is one multiplication gate and a maximum degree of the unknown number Z is n+l−1, the degree of p(X, Z) is n+l−1. It can be seen that even if the degree of Equation increases by transforming the bivariate polynomial into the univariate polynomial, it is more efficient than an AQP-based.

It is expected that the QPP dramatically improves a convolution prove time to greatly improve the overall performance, but the actual performance of CNN may not be improved. Even if a Z variable is not required in the ReLU and pooling operations, when the bivariate polynomial is transformed into the univariate polynomial, the degree of X is increased, so that unnecessary terms are filled.

Thus, in an embodiment of the present invention, as described above, the QPP is applied only to the convolution operation, and the QAP is applied to other operations (ReLU or pooling).

In an embodiment of the present invention, CP-SNARK will be adapted to ensure consistency between QAP-based ReLU and pooling circuit equations and a QPP-based convolution circuit.

CP-SNARK is a proof system that proves that a large number of pedersen-like commitments have been built for the same input. In one embodiment of the present invention, a Lego-SNARK scheme will be applied.

Two commitment keys ck and ck' are taken as an input and may be combined to generate a CRS. The proof algorithm may generate a new proof $\pi$ using the combined commitment. If commitments c and c' are made using the same input, the proof $\pi$ passes the verification as follows.

$$R_{cp} = \left\{ \phi = (c, c'), w = (r, r', \vec{u}) \;\middle|\; \begin{array}{c} c = \text{commit}(r, \vec{u}) \\ \wedge\; c' = \text{commit}(r', \vec{u}) \end{array} \right\}$$

$$(crs, td) \leftarrow \text{Setup}(R_{cp}, ck, ck'): ck = \{G_1^{h_i}\}_{i=0}^l, ck' = \{G_1^{f_i}\}_{i=0}^l.$$

parsed. $k_1$, $k_2$, $$a \xleftarrow{\$} Z_p$$

is selected and crs=$(G_1^{k_1 \cdot h_0}, G_1^{k_2 \cdot f_0}, \{G_1^{k_1 \cdot h_i + k_2 \cdot f_i}\}_{i=1}^l$ and $G_2^{ak_1}, G_2^{ak_2}, G_2^a)$ and a trap door td=$(k_1, k_2)$ are set.

$\pi \leftarrow$Prove(crs, $\phi$, w): r, r', $\{u_i\}_{i=1}^l \in$ w and (A, B, $\{C_i\}_{i=1}^l$, $vk_1$, $vk_2$, $vk_3$)$\in$crs are parsed. The proof n is calculated by using Equation 5.

[Equation 5]

$$\pi = A^r \cdot B^{r'} \cdot \prod_{i=1}^l C_i^{u_i}$$ [Equation 5]

1/0$\leftarrow$Verify(crs, $\phi$, $\pi$). If c, c'$\in \phi$, and (A, B, $\{C_i\}_{i=1}^l$, $vk_1$, $vk_2$, $vk_3$)$\in$ crs are parsed and then the following equation is satisfied, the proof is approved.

$e(c,vk_1) \cdot e(c',vk_2) = e(\pi,vk_3)$ $\pi \leftarrow$Sim(crs, td, $\phi$): $k_1$, $k_2 \in$ td an c, c'$\in \phi$ are parsed and then the proof $\pi$ is calculated as follows.

$\pi = c^{k_1} \cdot c'^{k_2}$

In order to connect the zero-knowledge proof including CP-SNARK, a commitment for input is needed like the proof. Thus, in one embodiment of the present invention, a cc-SNARK scheme for generating a commitment of a wire including a proof is generated similarly to Lego-SNARK.

In the verification of zk-SNARK, a pedersen-like commitment such as $$\prod_{i=0}^l G_1^{a_i(z) \cdot \frac{\beta u_i(x) + \alpha v_i(x) + w_i(x)}{\gamma}} = \prod_{i \in [l], j \in [d_2+1]} \left( G_1^{\frac{\beta u_i(x) + \alpha v_i(x) + w_i(x)}{\gamma} \cdot z^j} \right)^{a_{i,j}}$$

included to be delegated to the verifier. Accordingly, in one embodiment of the present invention, a proof system that performs the commitment may be generated.

The CRS is set to add a commitment key $$G_1^{\frac{\eta}{\gamma}},$$

and an additional random $$G_1^{\frac{\eta}{\delta}}.$$

The proof algorithm additionally generates a commitment $G_1^d$, adds a commitment $$-v\frac{\eta}{\delta}$$

to c during verification, and cancels any part of the commitment.

The verification algorithm takes cm as an input and verifies the proof $\pi$. VerifyCom verifies a commitment cm. The modified algorithm is as follows.

(cm, $\pi$, v)$\leftarrow$Prove(crs, $\phi$, w): $\phi$ is parsed with $(a_0(Z), a_1(Z), \ldots a_l(Z))$, and w is parsed with $(a_{l+1}(Z), \ldots, a_m(Z))$. The witness is used to calculate h(X, Z) from QPP. r, s, $$v \xleftarrow{\$} Z^*_p$$

is selected, and a random v, a commitment cm=$G_1^d$, and $\pi=(G_1^a, G_2^b, G_1^c)$ are output.

$$a = \alpha + \sum_{i=0}^m a_i(z)u_i(x) + r\delta \quad b = \beta + \sum_{i=0}^m a_i(z)v_i(x) + s\delta$$

$$c = \frac{\sum_{k=l+1}^m a_i(z) \cdot (\beta u_i(x) + \alpha v_i(x) + w_i(x)) + h(x,z)t(x)}{\delta} + As + rB - rs\delta - v\frac{\eta}{\delta}$$

$$d = \frac{\sum_{k=0}^l a_i(z) \cdot (\beta u_i(x) + \alpha v_i(x) + w_i(x))}{\gamma} + v\frac{\eta}{\gamma}$$

0/1$\leftarrow$Verify(crs, $\phi$, cm, $\pi$): $\phi$ is parsed with $(a_0(Z), a_1(Z), \ldots, a_l(Z))$ and n is parsed with (A, B, C). When the following equation is satisfied, the witness is approved.

$e(A,B) = e(G_1^\alpha, G_2^\beta) \cdot e(cm, G_2^\gamma) \cdot e(C, G_2^\delta)$ 0/1$\leftarrow$VerifyCom(ck, w, r, cm): A message u in w is parsed. If the following equation is satisfied, the witness is approved.

$cm = (r, \vec{u}) \cdot ck$ (v, cm, $\pi$)$\leftarrow$Sim($\tau$, $\phi$): a, b, $$v \xleftarrow{\$} Z^*_p$$

is selected and the simulated commitment cm=$G_1^d$ and the proof $\pi=(G_1^a, G_2^b, G_1^c)$ are calculated.

$$c = \frac{ab - \alpha\beta - \sum_{i=0}^{l} a_i(z)(\beta u_i(x) + \alpha v_i(x) + w_i(x)) - v\eta}{\delta}$$

$$d = \frac{\sum_{i=0}^{l} a_i(z)(\beta u_i(x) + \alpha v_i(x) + w_i(x)) + v\eta}{\gamma}$$

According to an embodiment of the present invention, cc-SNARKs and CP-SNARKs are used to prove the convolution neural network model.

A relationship $R_{CNN}$ of the convolutional neural network model includes $R_{convol}$, $R_{ReLU+Pool}$, and $R_{cp}$. Wherein, $R_{convol}$ is encoded to QPP including Z, and $R_{ReLU+Pool}$ is encoded to QAP.

It is assumed that $\Pi_{qap}$=(Setup, Prove, Verify, VerifyCom, Sim) is a QAP-based cc-SNARKs scheme, $\Pi_{qpp}$=(Setup, Prove, Verify, and VerifyCom, Sim) are a QPP-based cc-SNARKs scheme, and $\Pi_{cp}$=(Setup, Prove, Verify, Sim) is a CP-SNARKs scheme.

(crs, td)←Setup($R_{CNN}$): $R_{CNN}$ is parsed with a relationship of $R_{convol}$, $R_{ReLU+Pool}$, and then a crs and a td are calculated as follows.

$ck_{qap}, crs_{qap}, td_{qap} \leftarrow \Pi_{qap}.\text{Setup}(R_{ReLU+Pool})$ $ck_{qpp}, crs_{qpp}, td_{qpp} \leftarrow \Pi_{qpp}.\text{Setup}(R_{conv})$ $crs_{cp}, tds_{cp} \leftarrow \Pi_{cp}.\text{Setup}(ck_{qap}, ck_{qpp})$ Set $crs=(crs_{qap}, crs_{qpp}, crs_{cp})$ and $td=(td_{qap}, td_{qpp}, td_{cp})$ $\pi \leftarrow$ Prove(crs, $\phi$, w): ($\phi$, w) is parsed with ($\phi_{qap}$, $w_{qap}$) and ($\phi_{qpp}$, $w_{qpp}$).
In addition, crs is parsed with ($crs_{qap}$, $crs_{qpp}$, $crs_{cp}$). Next, the proof is calculated as follows.

$\pi_{qap}, r_{qap}, cm_{qap} \leftarrow \Pi_{qap}.\text{Prove}(crs_{qap}, \phi_{qap}, w_{qap})$ $\pi_{qpp}, r_{qpp}, cm_{gpp} \leftarrow \Pi_{qpp}.\text{Prove}(crs_{qpp}, \phi_{qpp}, w_{qpp})$ parse$\pi_{qap} = (A_{qap}, B_{qap}, C_{qap})$ parse$\pi_{qpp} = (A_{qpp}, B_{qpp}, C_{qpp})$ $\phi_{cp} = (cm_{qap}, cm_{qpp})$ $w_{cp} = (r_{qap}, \vec{y}, r_{gpp}, \vec{y}')$ $\pi_{cp} \leftarrow \Pi_{cp}.\text{Prove}(crs_{cp}, \phi_{cp}, w_{cp})$ Set $\pi = (\pi_{qap}, \pi_{qpp}, \pi_{cp}, cm_{qap}, cm_{qpp})$.

0/1←Verify($R_{CNN}$, crs, $\phi$, $\pi$): $\phi = (\phi_{qap}, \phi_{qpp})$ is parsed. The crs is parsed with ($crs_{qap}$, $crs_{qpp}$, $crs_{cp}$) and $\pi$ is parsed with ($\pi_{qap}$, $\pi_{qpp}$, $\pi_{cp}$, $cm_{qap}$, $cm_{qpp}$). In addition, $\pi_{qap} = (A_{qap}, B_{qap}, C_{qap})$ and $\pi_{qpp} = (A_{qpp}, B_{qpp}, C_{qpp})$ are parsed. Next, if the following equation is satisfied, the proof is approved.

assert$\Pi_{qap}$.Verify($crs_{qap}, \phi_{qap}, cm_{qap}, \pi_{qap}$)=1 assert$\Pi_{qpp}$.Verify($crs_{qpp}, \phi_{qpp}, cm_{qpp}, \pi_{qpp}$)=1 assert$\Pi_{cp}$.Verify($crs_{cp}, (cm_{qap}, cm_{qpp}), \pi_{cp}$)=1

$\pi \leftarrow$ Sim(crs, r, $\phi$): $\phi = (\phi_{qap}, \phi_{qpp})$ and td=($td_{qap}$, $td_{qpp}$, $td_{cp}$) are parsed. Next, $\pi$ is calculated as follows.

$cm_{qap}, \pi_{qap} \leftarrow \Pi_{qap}.\text{Sim}(crs_{qap}, td_{qap}, \phi_{qap})$ $cm_{qpp}, \pi_{qpp} \leftarrow \Pi_{qpp}.\text{Sim}(crs_{qpp}, td_{qpp}, \phi_{qpp})$ $\phi_{cp} = (cm_{qap}, cm_{qpp})$ $\pi_{cp} \leftarrow \Pi_{cp}.\text{Sim}(crs_{cp}, td_{cp}, \phi_{cp})$ Set $\pi = (\pi_{qap}, \pi_{qpp}, \pi_{cp}, cm_{qap}, cm_{qpp})$.

According to an embodiment of the present invention, a certain size of proof may be generated regardless of the number of layers in the convolutional neural network model. Since a constraint relationship is confirmed in the proof device, a calculation order may be ignored. Therefore, proofs for QPP and QAP may be generated once using a given value without a repetitive layer. As a result, according to one embodiment of the present invention, three proofs and two commitment values may be generated. The detailed description would have been fully understood by the above description.

Figure 7:
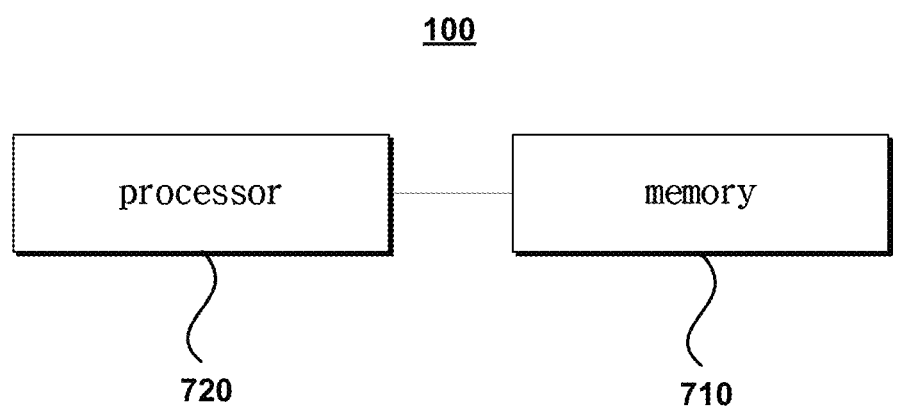
FIG. 7 is a block diagram schematically illustrating an internal configuration of a device for verifying a convolution neural network model according to an embodiment of the present invention.

FIG. 7 is a block diagram schematically illustrating an internal configuration of a device for verifying a convolution neural network model according to an embodiment of the present invention.

Referring to FIG. 7, a device 100 for verifying a convolutional neural network according to an embodiment of the present invention is configured by including a memory 710 and a processor 720.

The memory 710 stores instructions required for performing a method for verifying a convolutional neural network model according to an embodiment of the present invention.

The processor 720 controls the memory 710 and executes the instructions stored in the memory 710. The instructions executed by the processor 720 may generate a first commitment value and a proof value by transforming a convolution operation of the convolutional neural network model into a QPP-based circuit equation and then applying the result to a zero-knowledge proof scheme. Here, the QPP-based circuit equation may consist of one multiplication gate. Since this is the same as described above, the detailed description will be omitted. Further, the instructions executed by the processor 720 may generate a second commitment value and a proof value by transforming other operations (ReLU and pooling) of the convolutional neural network model into a QAP-based circuit equation and then applying the result to a zero-knowledge proof scheme. At this time, since the convolution operation and other operations of the convolutional neural network model are separated and the zero-knowledge proof scheme is separately applied, in order to ensure these continuity (identity), the first commitment value and the second commitment value may be applied to Lego-SNARK to generate a connection proof value.

As a result, when verifying the convolutional neural network model according to an embodiment of the present invention, two commitment values and three proof values for the convolutional neural network model are generated and the convolutional neural network model may be verified by using these values. Since this is the same as described with reference to FIGS. 1 to 6, the detailed description will be omitted.

FIGS. 8A-8C and 9A-9C are diagrams illustrating verification results for a small CNN having one convolution layer and one pooling layer. FIGS. 8A, 8B, and 8C illustrate results of comparing a setup time, a prove time, and a crs size by changing a convolution input size in which a kernel size is 10, a depth is 3, and a quantization bit depth is 10, respectively.

Figure 9C:
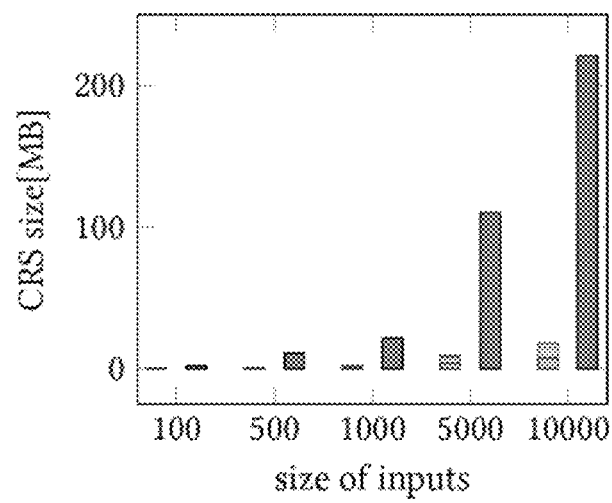

FIGS. 9A-9C are graphs showing a comparison result when other parameters are the same and a kernel size is 50.

As shown in FIGS. 8A-8C and 9A-9C, it can be seen that the method for verifying the convolutional neural network model according to an embodiment of the present invention has a better result in terms of the performance and the crs size.

Figure 10A:
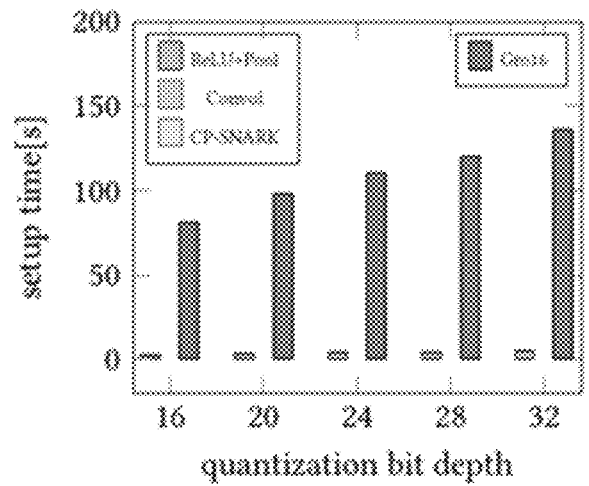
FIGS. 10A-10C are graphs showing results of a MNIST CNN model consisting of single convolutional and pooling layers having a kernel size of 9 and a kernel depth of 64.
Figure 10B:
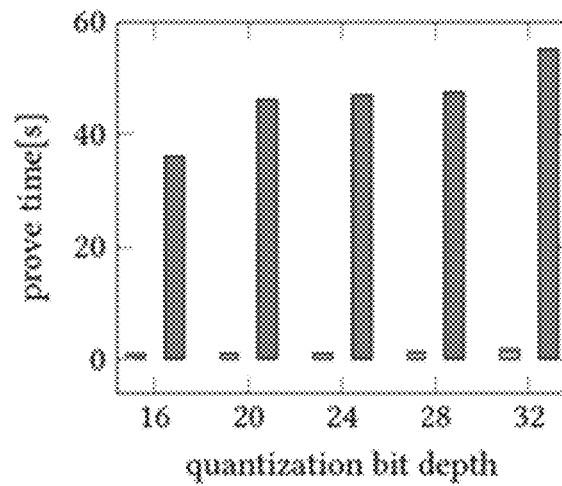
Figure 10C:
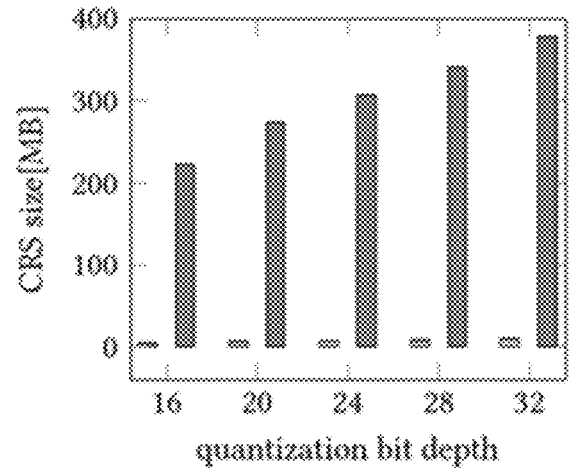
Figure 11A:
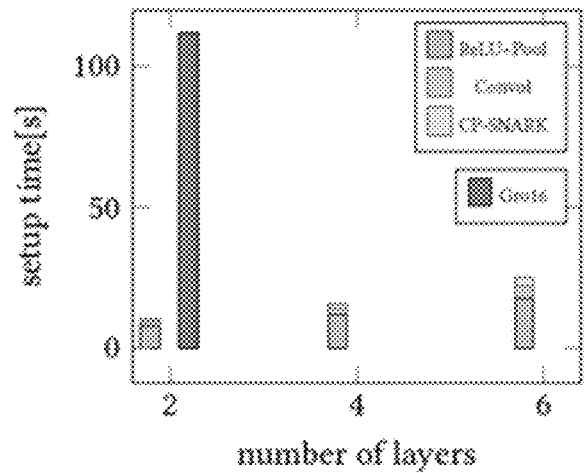
FIGS. 11A-11C are graphs showing results for a multilayer CNN when a kernel size is 9 and a quantization bit depth is 10.
Figure 11B:
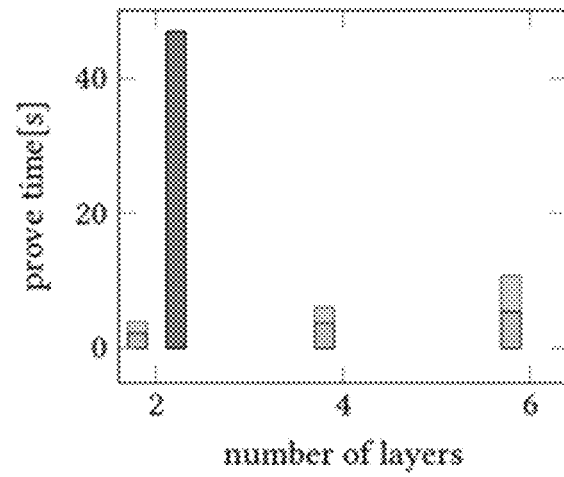
Figure 11C:
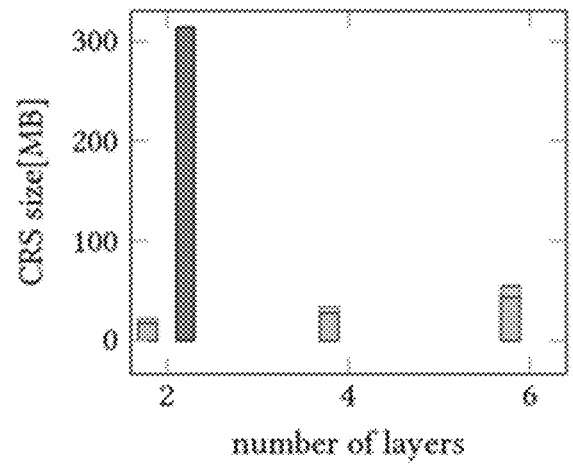

FIGS. 10A-10C are graphs showing results of a MNIST CNN model consisting of single convolution and pooling layers having a kernel size of 9 and a kernel depth of 64. It can be seen that when the method for verifying the convolutional neural network is up to 20 times faster than Gro16 and the quantization bit depth is 32, the CRS size is up to 30 times smaller than Gro16. FIGS. 11A-11C are graphs showing results for a multilayer CNN when a kernel size is 9 and a quantization bit depth is 10. FIGS. 11A to 11C illustrate that in the case of a two-layer model, in the method for verifying the convolutional neural network model according to the embodiment of the present invention, a Gro16qhek setup time is 10.6 times faster, a prove time is 12 times faster, and a crs size is 14.5 times smaller.

In the method for verifying the convolutional neural network model according to an embodiment of the present invention, a proof is generated within 11 seconds with a crs size of 55 MB, while in the case of Gro16, a proof is not generated if the number of layers is two or more due to a large-scale runtime memory request.

Figure 12A:
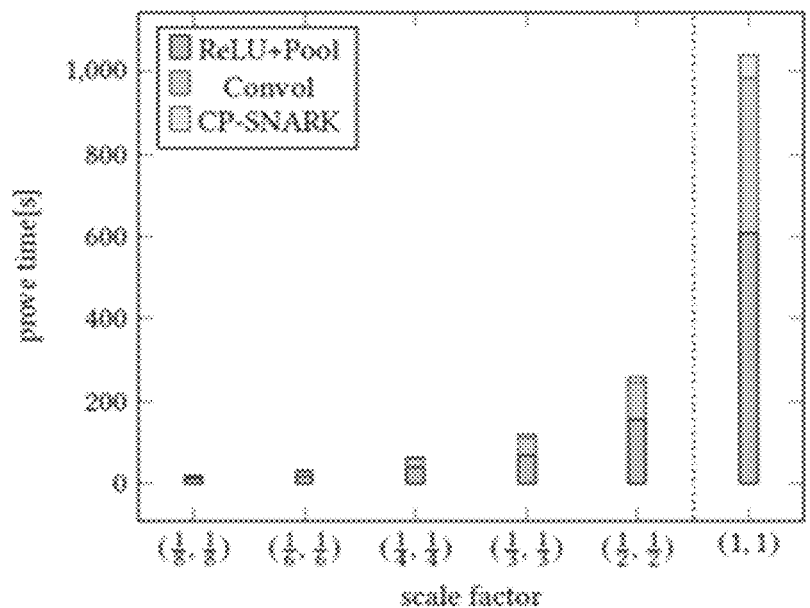
FIGS. 12A-12B are diagrams illustrating results of representing a prove time and a crs size by changing a scale factor of AlexNet in the method for verifying the convolution neural network model according to an embodiment of the present invention.
Figure 12B:
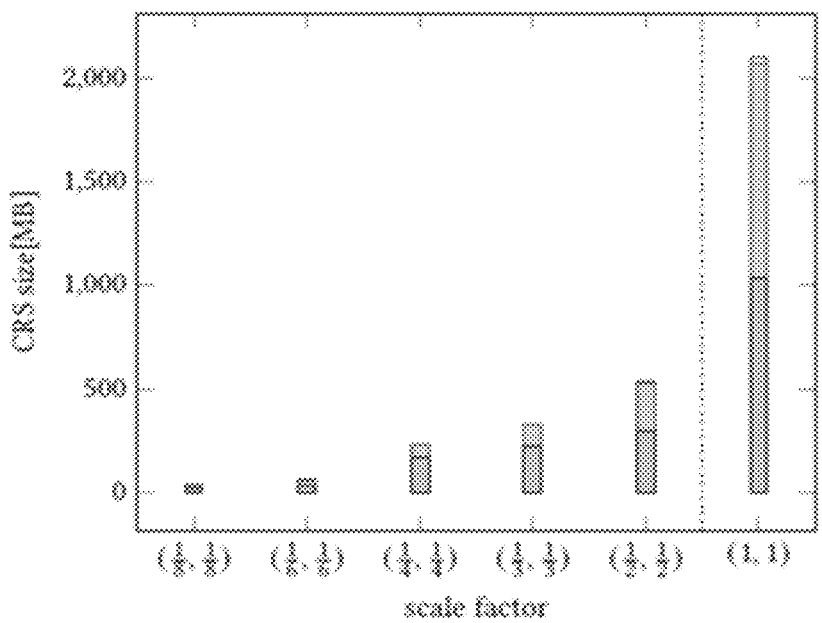
Figure 13:
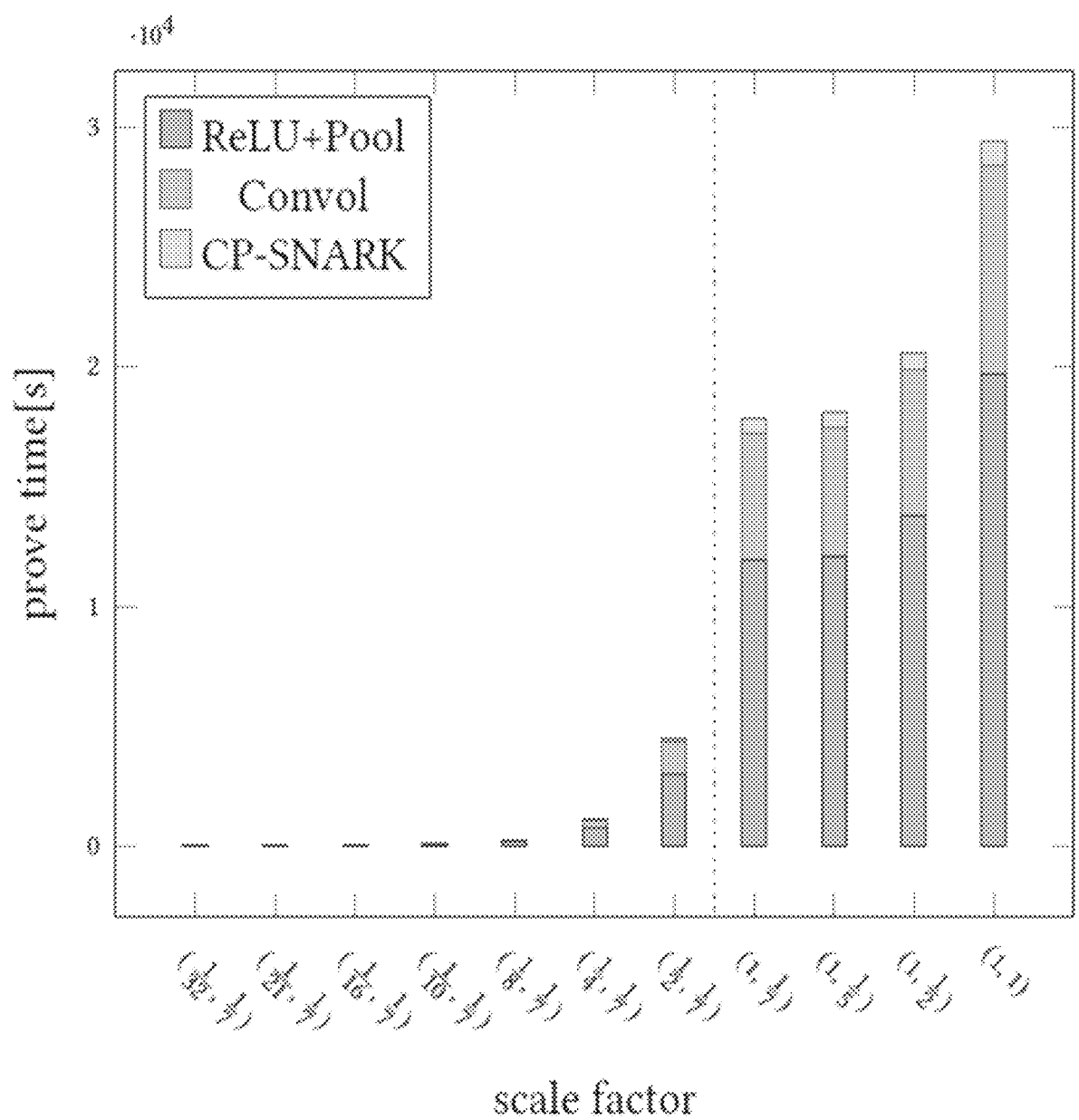
FIGS. 13 and 14 are diagrams illustrating results of representing a prove time and a crs size by changing a scale factor of a VGG16 model in the method for verifying the convolution neural network model according to an embodiment of the present invention.
Figure 14:
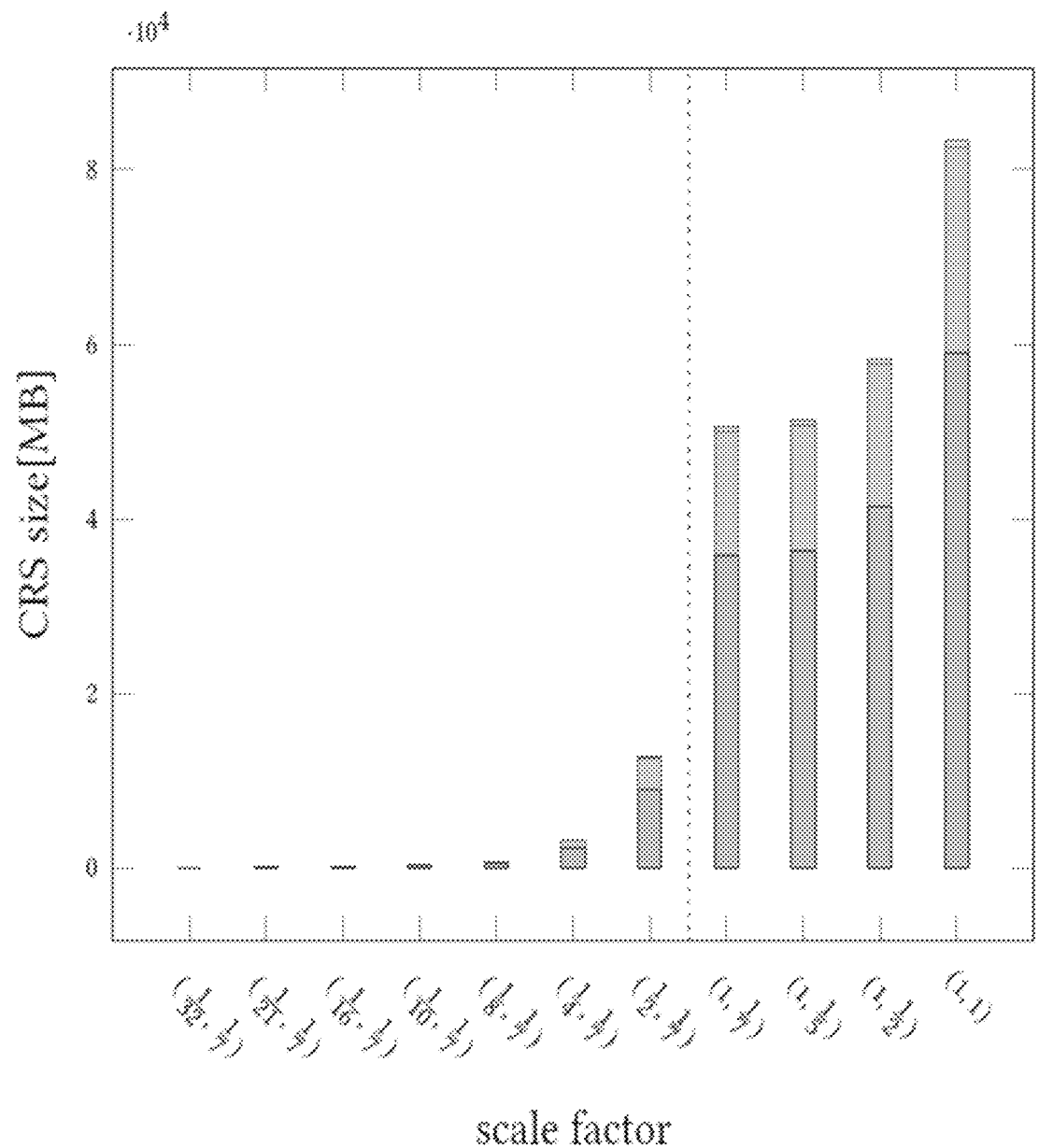

FIGS. 12A-12B are diagrams illustrating results of representing a prove time and a crs size by changing a scale factor of AlexNet in the method of verifying the convolution neural network model according to an embodiment of the present invention and FIGS. 13 and 14 are diagrams illustrating results of representing a prove time and a crs size by changing a scale factor of a VGG16 model in the method of verifying the convolution neural network model according to an embodiment of the present invention.

In the method for verifying the convolutional neural network model according to an embodiment of the present invention, the setup time, the prove time, and the CRS size are 291 times faster than those of Gro16 for LeNet-5. In addition, AlexNet is 1200 times faster and smaller than Gro16. It can be seen that Gro16 requires a time of more than 10 years to generate a proof of VGG16, and thus, in fact, the proof is impossible.

The device and the method according to the embodiments of the present invention are implemented in a form of program instructions which may be performed through various computer means and may be recorded in a computer readable recording medium. The computer readable recording medium may include program instructions, data files, a data structure, and the like alone or in combination. The program instructions recorded in the computer readable recording medium may be specially designed and configured for the present invention, or may be known to and used by those skilled in the computer software art. Examples of the computer readable recording medium include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include advanced language codes executable by a computer by using an interpreter and the like, as well as machine language codes generated by a compiler.

The hardware device described above may be configured to be operated with one or more software modules to perform the operation of the present invention, and vice versa.

Hereinabove, the present invention has been described with reference to the embodiments thereof. It will be understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is defined by the appended claims rather than by the foregoing description, and all differences within the equivalent range thereof should be construed as being included in the present invention.

What is claimed is:

1. A method for verifying a convolutional neural network model comprising the steps of:
    (a) generating a polynomial circuit equation for a first configuration of a plurality of configurations configuring the convolutional neural network model;
    (b) generating a first commitment value and a first proof value by applying a zero-knowledge proof scheme based on the polynomial circuit equation;
    (c) generating an arithmetic circuit equation for a second configuration of the plurality of configurations;
    (d) generating a second commitment value and a second proof value by applying a zero-knowledge proof scheme based on the arithmetic circuit equation; and
    (e) generating a connection proof value connecting the first commitment value and the second commitment value.

2. The method for verifying the convolutional neural network model of claim 1, wherein the first configuration is a convolution operation, and
    the second configuration is other operations except for the convolution operation.

3. The method for verifying the convolutional neural network model of claim 2, wherein the polynomial circuit equation is configured by a single multiplication gate,
    the single multiplication gate includes two input polynomial circuit equations and one output polynomial circuit equation,
    wherein one of the two input polynomial circuit equations is a polynomial having input values for the convolution operation as a coefficient of each degree and the other input polynomial circuit equation is a polynomial circuit equation having element values of a kernel of the convolution operation as a coefficient of each degree, and
    the output polynomial circuit equation is a polynomial circuit equation for a product of results of the two input polynomial circuit equations.

4. The method for verifying the convolutional neural network model of claim 3, wherein the polynomial circuit equation is generated by further considering a contingent intermediate variable (Z).

5. The method for verifying the convolutional neural network model of claim 4, wherein the contingent intermediate variable (Z) is applied to all of the two input polynomial circuits.

6. The method for verifying the convolutional neural network model of claim 1, wherein the polynomial circuit equation is a quadratic polynomial program (QPP)-based circuit equation,
    the arithmetic circuit equation is a quadratic arithmetic program (QAP)-based circuit equation, and
    the connection proof is generated based on Lego-SNARK.

7. The method for verifying the convolutional neural network model of claim 1, further comprising:
proving the convolutional neural network model by using the first commitment value, the second commitment value, the connection proof value, the first proof value, and the second proof value.

8. A non-transitory computer readable recording medium product recording program codes for performing a method for verifying a convolutional neural network model comprising the steps of:
(a) generating a polynomial circuit equation for a first configuration of a plurality of configurations configuring the convolutional neural network model;
(b) generating a first commitment value and a first proof value by applying a zero-knowledge proof scheme based on the polynomial circuit equation;
(c) generating an arithmetic circuit equation for a second configuration of the plurality of configurations;
(d) generating a second commitment value and a second proof value by applying a zero-knowledge proof scheme based on the arithmetic circuit equation; and
(e) generating a connection proof value connecting the first commitment value and the second commitment value.

9. A device for verifying a convolutional neural network model comprising:
a memory for storing at least one instruction; and
a processor for executing the instructions stored in the memory,
wherein the instructions perform the steps of:
(a) generating a polynomial circuit equation for a convolution operation configuring the convolutional neural network model;
(b) generating a first commitment value and a first proof value by applying a zero-knowledge proof scheme based on the polynomial circuit equation;
(c) generating an arithmetic circuit equation for other operations except for the convolution operation configuring the convolutional neural network model;
(d) generating a second commitment value and a second proof value by applying a zero-knowledge proof scheme based on the arithmetic circuit equation; and
(e) generating a connection proof value connecting the first commitment value and the second commitment value.

10. The device for verifying the convolutional neural network model of claim 9, wherein the polynomial circuit equation is configured by a single multiplication gate,
the single multiplication gate includes two input polynomial circuit equations and one output polynomial circuit equation,
wherein one of the two input polynomial circuit equations is a polynomial having input values for the convolution operation as a coefficient of each degree and the other input polynomial circuit equation is a polynomial having element values of a kernel of the convolution operation as a coefficient of each degree, and
the output polynomial circuit equation is a polynomial circuit equation for a product of results of the two input polynomial circuit equations.

11. The device for verifying the convolutional neural network model of claim 10, wherein the polynomial circuit equation is generated by further considering a contingent intermediate variable ($Z$).

12. The device for verifying the convolutional neural network model of claim 9, wherein after step (e), proving the convolutional neural network model by using the first commitment value, the second commitment value, the connection proof value, the first proof value, and the second proof value is further performed.

* * * * *